US012080981B2

(12) United States Patent
Conte

(10) Patent No.: US 12,080,981 B2
(45) Date of Patent: Sep. 3, 2024

(54) CABLE PROCESSING MACHINE APPARATUS

(71) Applicant: Komax Holding AG, Dierikon (CH)

(72) Inventor: Alois Conte, Ebikon (CH)

(73) Assignee: KOMAX HOLDING AG, Dierikon (CH)

(*) Notice: Subject to any disclaimer, the term of this patent is extended or adjusted under 35 U.S.C. 154(b) by 816 days.

(21) Appl. No.: 17/250,345

(22) PCT Filed: Jul. 17, 2019

(86) PCT No.: PCT/EP2019/069262
§ 371 (c)(1),
(2) Date: Jan. 8, 2021

(87) PCT Pub. No.: WO2020/020725
PCT Pub. Date: Jan. 30, 2020

(65) Prior Publication Data

US 2021/0320469 A1 Oct. 14, 2021

(30) Foreign Application Priority Data

Jul. 24, 2018 (EP) .................................... 18185259

(51) Int. Cl.
*H01R 43/052* (2006.01)
*H01R 43/055* (2006.01)

(52) U.S. Cl.
CPC ......... *H01R 43/052* (2013.01); *H01R 43/055* (2013.01); *Y10T 29/53183* (2015.01)

(58) Field of Classification Search
CPC .. H01R 43/052; H01R 43/055; H01R 43/048; H01R 43/28; Y10T 29/53261; Y10T 29/534; Y10T 29/53183
USPC .................................. 29/742, 33 F, 745, 748
See application file for complete search history.

(56) References Cited

U.S. PATENT DOCUMENTS

| | | | | |
|---|---|---|---|---|
| 3,848,753 | A | 11/1974 | Borg et al. | |
| 4,490,084 | A | 12/1984 | Collier et al. | |
| 7,043,825 | B2 * | 5/2006 | Conte | B25J 15/0213 29/748 |
| 8,113,557 | B2 * | 2/2012 | Kirst | B66C 1/447 294/192 |
| 9,373,924 | B2 | 6/2016 | Fischer | |
| 9,640,954 | B2 | 5/2017 | Fischer | |
| 10,056,728 | B2 | 8/2018 | Conte | |
| 2001/0032680 | A1 | 10/2001 | Mizutani | |
| 2010/0295327 | A1 | 11/2010 | Kirst et al. | |

(Continued)

FOREIGN PATENT DOCUMENTS

| | | | |
|---|---|---|---|
| CN | 105191021 | A | 12/2015 |
| EP | 0052983 | A2 | 6/1982 |
| EP | 1073163 | A1 | 1/2001 |

(Continued)

*Primary Examiner* — Thiem D Phan
(74) *Attorney, Agent, or Firm* — Williams J. Clemens; Shumaker, Loop & Kendrick, LLP

(57) ABSTRACT

A cable processing machine apparatus includes a cable processing machine for processing a cable, in particular a crimping machine for connecting a cable to a crimp contact by a crimping connection, and a handling robot that includes a gripping arm for gripping a portion of the cable or of multiple cables and moving the cable(s) into the cable processing machine and/or out of the cable processing machine.

3 Claims, 18 Drawing Sheets

(56) References Cited

U.S. PATENT DOCUMENTS

2012/0263344 A1 10/2012 Viviroli

FOREIGN PATENT DOCUMENTS

| | | | |
|---|---|---|---|
| EP | 1447888 | A1 | 8/2004 |
| EP | 2511648 | A1 | 10/2012 |
| EP | 2738886 | A1 | 6/2014 |
| EP | 2797182 | A1 | 10/2014 |
| EP | 2442413 | B1 | 8/2017 |
| EP | 3219654 | A1 | 9/2017 |
| JP | H11219628 | A | 8/1999 |

* cited by examiner

CABLE PROCESSING MACHINE APPARATUS

FIELD

The present invention relates to a cable processing machine apparatus, a method for removing cables from a removal trough of a cable processing machine, a plurality of further methods and a cable replacement device for a cable processing machine.

BACKGROUND

Although cable processing machines can produce production batches, each comprising a plurality of pieces of an identically assembled cable, fully automatically, the conversion of the cable processing machine to another article, the "refilling" of the material to be processed and the removal of the finished production batches of the cables or the processed cables previously required a machine operator. The activities that the machine operator must perform include the following activities in particular:

- replacing the cable to be processed
- replacing the crimping tool and/or the crimp contact roller
- delivering cable samples to measuring devices or quality control devices for quality monitoring
- removing defectively produced or processed cables
- removing finished or processed production batches of the cables The number of identical articles to be produced or processed cables is usually divided into smaller production batches, which have to be removed individually from the cable processing machine. Conventional cable processing machines have a cable tray, in which the ready-made or processed cables are stored until the number making up a production batch is reached, and a removal trough from which the batch can be removed by hand. The cable tray can be pivoted so that the processed cables of a production batch fall from the cable tray into the removal trough. The removal of each batch must be confirmed by the machine operator, which means that the cable processing machine stops after each manufactured batch until the batch has been removed and confirmed by the machine operator.

This leads to longer interruptions in the operation of the cable processing machine or a cable processing machine apparatus comprising a cable processing machine.

Among other things, there may be a need for a cable processing machine apparatus or a method in which at least some of the activities previously performed manually by the machine operator can or will be carried out automatically, as well as a cable replacement device for automatically replacing the cable processed by the cable processing machine apparatus.

SUMMARY

According to a first aspect, the invention relates to a cable processing machine apparatus comprising a cable processing machine for processing a cable, in particular a crimping machine for connecting a cable to a crimp contact by means of a crimp connection, and a handling robot, wherein the handling robot has a gripping arm for gripping part of the cable or of a plurality of cables for moving the cable or cables into the cable processing machine and/or out of the cable processing machine.

One advantage of this is that cables can be removed from the cable processing machine and/or fed to the cable processing machine in a technically simple automated manner. As a result, the cable processing machine can be operated in a technically simple manner without interruption, without manual intervention or without intervention by a machine operator. This increases the number of cables or batches of processed cables that can be processed by the cable processing machine apparatus per unit of time.

According to a second aspect, the invention relates to a method for removing cables from a removal trough of a cable processing machine for processing a cable, wherein the method comprises the following steps: gripping and holding cables processed by the cable processing machine in the removal trough with a gripping arm, in particular with a gripping arm of a cable processing machine apparatus as described above; moving the gripping arm which holds the processed cables to move the processed cables out of the removal trough; and opening the gripping arm to release the previously held cables.

The advantage of this method is that batches of processed cables or the processed cables are automatically removed from the removal trough. As a result, the cable processing machine can be operated in a technically simple manner without interruption, without manual intervention or without intervention by a machine operator. This increases the number of cables or batches of processed cables that can be processed by the cable processing machine apparatus per unit of time.

According to a third aspect, the invention relates to a method, in particular a method as described above, wherein the method is suitable for changing a cable used by a cable processing machine, and wherein the method comprises the following steps: pulling out a cable used by the cable processing machine with a cable gripper of a gripping arm, in particular with a cable gripper of a gripping arm of a cable processing machine apparatus as described above, and holding the cable with the cable gripper; moving the cable held by the cable gripper into a cable holding device such that the cable is held by the cable holding device; releasing the cable held by the cable holding device by the cable gripper; removing another cable from the cable holding device with the cable gripper; and inserting the other cable into the cable processing machine by means of the cable gripper in such a way that the cable processing machine uses the other cable.

The advantage of this is that in a technically simple automated or mechanical manner the cable used or processed by the cable processing machine can be replaced or exchanged for another cable.

According to a fourth aspect, the invention relates to a method, in particular a method as described above, wherein the method is suitable for replacing a cable processing cassette used by a cable processing machine for receiving cable contacts and a cable tool with another cable processing cassette comprising cable contacts and a cable tool, wherein the method includes the following steps: gripping and holding the cable processing cassette used by the cable processing machine with a gripping arm, in particular with a gripping arm of a cable processing machine apparatus as described above; moving the cable processing cassette held by the gripping arm into a cable processing cassette holder configured to hold a plurality of cable processing cassettes; releasing the cable processing cassette by the gripping arm; gripping another cable processing cassette with the gripping arm; and moving the other cable processing cassette held by the gripping arm to a position of the cable processing machine where the cable processing machine can use the other cable processing cassette.

One advantage of this is that in a technically simple automated or mechanical manner the cable processing cassette or the cable contacts and the cable tool can be replaced or exchanged for other cable contacts or for another cable tool. If, for example, a cable contact roller is empty or a cable is to be connected to another cable contact and/or if the cable tool is to be exchanged for another, the change can be carried out quickly and automatically without manual intervention. The cable processing cassette can in particular be a crimping cassette. The cable contacts can in particular be crimp contacts. The cable tool can in particular be a crimping tool.

According to a fifth aspect, the invention relates to a method, in particular a method as described above, wherein the method is suitable for checking the properties of a cable and/or of a cable connected to a cable contact by a cable processing machine, wherein the method comprises the following steps: gripping and holding a cable with a cable gripper of a gripping arm, in particular with a cable gripper of a gripping arm of a cable processing machine apparatus as described above; moving the cable by means of the gripping arm to a quality control device for checking properties of the cable and/or the connection between the cable contact and the cable; and checking the properties of the cable and/or the connection between the cable contact and the cable by means of the quality control device, while the cable gripper holds the cable.

The advantage here is that the properties of the cable and/or the connection between the cable contact/crimp contact and the cable can be checked in a technically simple and automated manner. In this way, cables of inferior quality can quickly be recognized as rejects and can be reproduced accordingly in order to obtain a predetermined number of cables produced with a predetermined quality. Thus, no manual intervention is necessary for the quality control.

According to a sixth aspect, the invention relates to a method, in particular a method as described above, wherein the method is suitable for removing cables, which are partially located in a cable tray of a cable processing machine, from the cable processing machine, wherein the method comprises the following steps: gripping and holding a cable, which is partially located in the cable tray of the cable processing machine, with a cable gripper of a gripping arm, in particular with a cable gripper of a gripping arm of a cable processing machine apparatus as described above; moving the cable gripper to remove the cable from the cable processing machine; and releasing the cable held by the cable gripper.

One advantage of this is that defectively produced cables can be removed from the cable tray in a technically simple automated or mechanical manner. No manual intervention or manual confirmation by an operator of the cable processing machine is required. This increases the number of cables that can be produced by means of the cable processing machine per unit of time. With this method, a cable that is already partially located in the cable tray is simply removed from the cable tray. In this way, in particular, cables that have been produced defectively can be easily removed from the cable tray. In particular, if it is found that a first end of the cable was defectively connected to a cable contact, the cable can be removed without first further processing the cable, for example by connecting a contact to the second end of the cable. This saves time and material.

According to a seventh aspect, the invention relates to a method, in particular a method as described above, wherein the method is suitable for a cable gripper of a gripping arm to take over a cable from a pivot unit of a cable processing machine, wherein the method comprises the following steps: gripping and holding a part of the cable with the pivot unit of the cable processing machine; pivoting out the pivot unit for moving the cable out of a cable processing axis in which the cable runs while the cable is being transported in the cable processing machine; and grasping and holding part of the cable held by the pivot unit with a cable gripper of a gripping arm, in particular with a cable gripper of a gripping arm of a cable processing machine apparatus as described above.

One advantage of this is that the cable is technically simply transferred from the pivot unit to the cable gripper or the gripping arm. In this way, in particular, cables that are initially arranged along the cable processing axis can be grasped and held by the cable gripper or the gripping arm in a technically particularly simple manner. They can then be fed, for example, to a quality control device and/or removed from the cable processing machine apparatus and moved into a reject tray or the like.

According to an eighth aspect, the invention relates to a cable replacement device for a cable processing machine for processing a cable, wherein the cable replacement device is designed to hold a plurality of cables for changing the cable used by the cable processing machine for processing, wherein the cable replacement device is designed in such a way that a gripping arm, in particular a gripping arm of a cable processing machine apparatus as described above, can remove cables from the cable replacement device and set down cables in the cable replacement device in such a way that they are held by the cable replacement device.

The advantage of this is that the cable used by the cable processing machine can be replaced or exchanged automatically. This means that when the cable that is used by the cable processing machine is replaced, no manual intervention on the part of a machine operator is necessary. This reduces the interruptions in the operation of the cable processing machine. In addition, the cables held in the cable replacement device can be exchanged in a technically simple manner without the operation of the cable processing machine having to be interrupted. This further reduces the number of interruptions in the operation of the cable processing machine.

Possible features and advantages of embodiments of the invention may be considered, inter alia and without limiting the invention, to be based on the ideas and findings described below.

According to one embodiment of the cable processing machine apparatus, the gripping arm has a cable gripper for gripping individual cables. As a result, individual cables can be handled or gripped and held by the gripping arm in a technically simple manner.

According to one embodiment of the cable processing machine apparatus, the cable gripper has a partially closed position in which the cable gripper holds the cable and can slide along the cable, and the cable gripper has a fully closed position in which the cable gripper holds the cable so firmly that the cable gripper cannot slide along the cable. As a result, the cable can be guided or held by the cable gripper while the cable is moved relative to the cable gripper or slides along the cable gripper. This increases the number of options for action of the cable gripper or the gripping arm.

According to one embodiment of the cable processing machine apparatus, the gripping arm is designed to remove cables, in particular processed cables, from a removal trough of the cable processing machine. The advantage here is that the batches of processed cables or the processed cables can be removed automatically from the removal trough. As a result, the cable processing machine can be operated in a technically simple manner without interruption, without manual intervention or without intervention by a machine operator. This increases the number of cables or batches of processed cables that can be processed by the cable processing machine apparatus per unit of time.

According to one embodiment of the cable processing machine apparatus, the handling robot is designed for gripping cable processing cassettes comprising a cable tool for processing the cable and cable contacts for connecting to the cable, in particular for gripping crimp cassettes comprising a crimping tool and crimp contacts, and for exchanging the cable processing cassette used by the cable processing machine for another cable processing cassette. As a result, the cable processing cassette, that is to say the cable processing tool and the cable contact, can be exchanged or replaced in an automated manner, that is to say without manual intervention by a machine operator. As a result, the operation of the cable processing machine does not have to be interrupted when the cable processing tool or cable tool is to be replaced or when the cable contacts of the cable processing cassette that is used are used up.

According to one embodiment of the cable processing machine apparatus, the cable processing machine apparatus is designed in such a way that the gripping arm can be moved on two opposite sides of the cable processing machine. This results in a large number of variable possible uses for the gripping arm. Thus, even more steps can be carried out automatically on the cable processing machine and consequently interruption times in the operation of the cable processing machine can be further reduced.

According to one embodiment of the cable processing machine apparatus, the gripping arm is adjustable in height relative to the cable processing machine, rotatable about its vertically extending axis and mounted pivotably about a second vertically extending axis. The advantage of this is that the gripping arm can be used very flexibly and can reach many different points or regions of the cable processing machine in order to grip and hold batches of cables or cables or cable processing cassettes there.

According to one embodiment of the cable processing machine apparatus, the handling robot has a guide rail for moving the gripping arm along a first axis of the cable processing machine apparatus, wherein the first axis is parallel to a cable processing axis in which the cable runs while the cable is being transported in the cable processing machine. As a result, the gripping arm can be moved in technically particularly simple and quick manner along the first axis or along the longitudinal axis of the cable processing machine.

According to one embodiment of the cable processing machine apparatus, the cable processing machine apparatus has a pivoting unit, wherein the pivoting unit is designed to move a part of the cable from a cable axis direction in which the cable runs while the cable is being transported in the cable processing machine, and to transfer the cable to the gripping arm. The advantage of this is that the cable can be transferred from the cable processing machine to the gripping arm in a technically particularly simple manner and can be transferred from the gripping arm to the cable processing machine.

According to one embodiment of the cable processing machine apparatus, the cable processing machine apparatus further comprises a cable replacement device for holding a plurality of cables, wherein the cable processing machine apparatus is designed to replace the cable used by the cable processing machine by means of the handling robot. The advantage here is that the cable that is processed by the cable processing machine can be replaced or exchanged automatically. This further reduces the need for manual intervention by a machine operator and interruptions in the operation of the cable processing machine.

According to one embodiment of the cable processing machine apparatus, the cable processing machine has a clamping device for clamping a cable that is fed to the cable processing machine, wherein the gripping arm and the clamping device are designed in such a way that the cable can be inserted into the clamping device by means of the gripping arm. One advantage of this is that the cable can be introduced into the cable processing machine in a technically simple and automated manner in order to use the cable and can be removed again from the cable processing machine. This simplifies the exchange or replacement of the cable used by the cable processing machine. In particular, the cable can be grasped by means of the gripping arm as follows: first the cable is partially inserted into the cable processing machine, then the clamping device firmly clamps or grips the cable, then the cable gripper of the gripping arm slides along the cable and thereby moves away from the cable processing device, now the cable gripper firmly grasps the cable again, the clamping device releases the cable and the cable gripper introduces another part of the cable into the cable processing machine. As a result, the cable can be introduced into the cable processing machine in a technically simple and reliable manner.

According to one embodiment of the cable processing machine apparatus, the cable processing machine apparatus further comprises a quality control device for checking properties of the cable and/or the connection between the cable contact and the cable, wherein the cable processing machine apparatus is designed in such a way that the cable is held by the gripping arm during the checking by the quality control device. The advantage here is that the quality of the cable and/or the processing of the cable, for example the quality of a crimp contact, can be checked automatically. This means that no human intervention or no intervention by a machine operator is necessary. This increases the number of cables or processing steps that can be processed or carried out by the cable processing machine apparatus per unit of time.

According to one embodiment of the cable processing machine apparatus, the cable processing machine apparatus further comprises a crimping cassette holder for holding a plurality of crimping cassettes. In this way, a plurality of crimping cassettes can be kept in stock in a technically simple manner, so that a large number of crimping cassettes are available for replacing or exchanging the crimping cassette used by the cable processing machine by means of the handling robot or the gripping arm. The crimping cassettes can have different crimp contacts or structurally identical crimp contacts. This allows the cable processing machine to be operated even longer without manual intervention.

According to one embodiment of the cable processing machine apparatus, the cable processing machine apparatus is designed in such a way that the handling robot can remove cables that are partially located in a cable tray of the cable processing machine from the cable processing machine. There is no need to interrupt the operation of the cable processing machine for manual intervention by a machine operator. This increases the number of cables or processing steps that can be processed or carried out by the cable processing machine apparatus per unit of time. In addition, this increases safety since no human hand has to be inserted into the cable processing machine.

It should be understood that some of the possible features and advantages of the invention are described herein with reference to different embodiments. A person skilled in the art will recognize that the features can be suitably combined, adapted or replaced in order to arrive at further embodiments of the invention.

Embodiments of the invention will be described in the following with reference to the accompanying drawings, although neither the drawings nor the description should be construed as limiting the invention.

The figures are merely schematic and are not true to scale. Like reference signs refer to like or equivalent features in the various figures.

DETAILED DESCRIPTION

Figure 1:
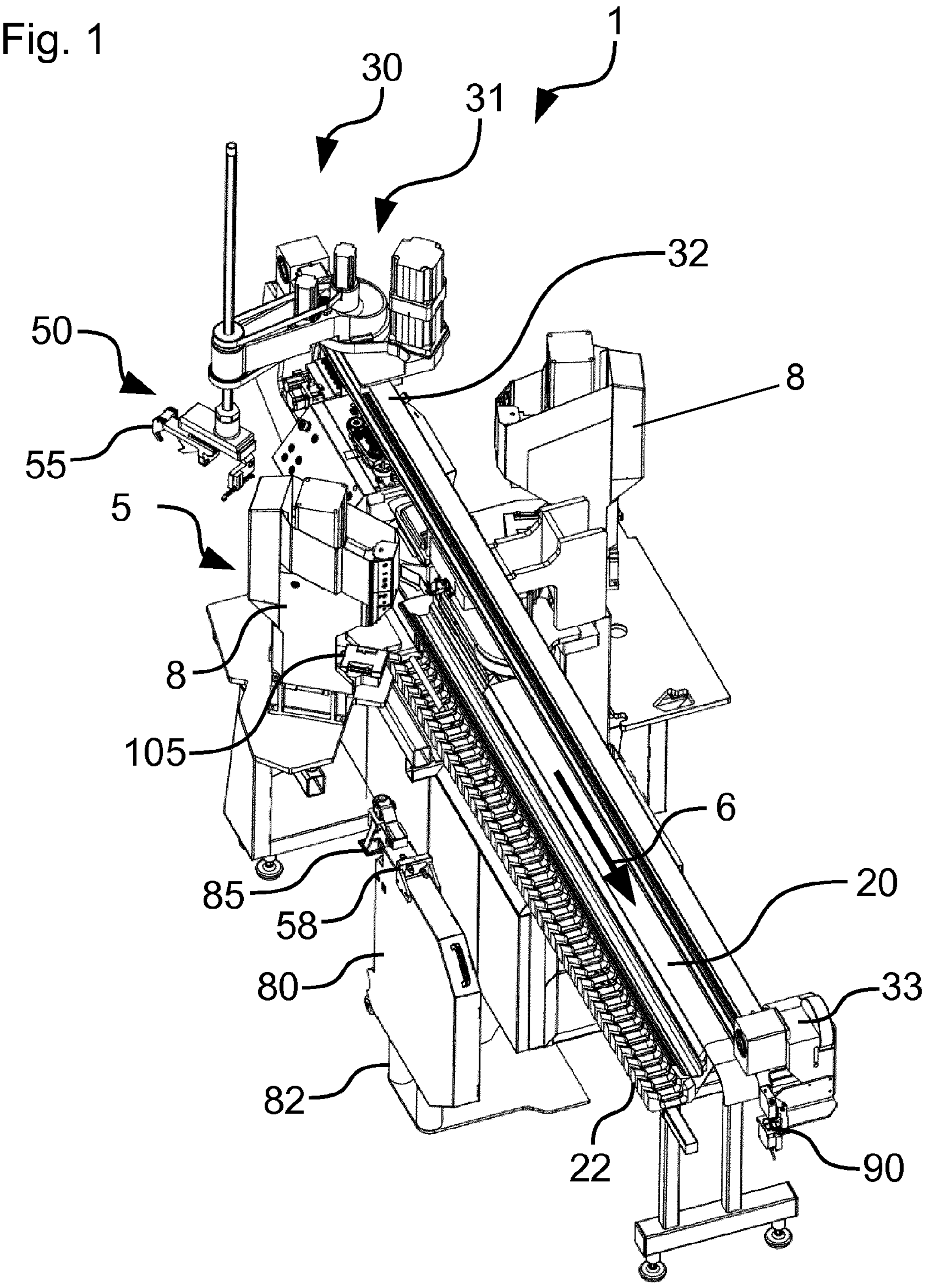
FIG. 1 is a perspective view of an embodiment of the cable processing machine apparatus according to the invention in the form of a crimping system.

FIG. 1 is a perspective view of an embodiment of the cable processing machine apparatus according to the invention in the form of a crimping system 1. The cable processing machine apparatus may be a crimping system 1. Accordingly, the cable processing machine apparatus comprises a cable processing machine 5 in the form of a crimping device 5 or crimping press 8 and a handling robot 30.

Other cable processing machines for processing cables 15 (FIG. 6) instead of the crimping device 5 or crimping press 8 are possible.

The crimping device 5 is designed to connect a crimp contact to a cable 15 by means of a crimp connection. The cables 15 that are processed or connected to the crimp contact are stored in a cable tray 20 of the cable processing machine 5 or the crimping device 5. The cable tray 20 can be tilted so that the cables 15 present in the cable tray 20, for example a production batch or a plurality of production batches of cables 15, fall into a lower-lying removal trough 22. The cable tray 20 and the removal trough 22 run parallel to one another and extend along a cable processing axis 6. The cables 15 are moved along in the cable processing machine 5 in the longitudinal direction of the cable tray 20, which is also referred to as the cable processing axis 6.

The cable processing machine 5 assembles the cable 15, i.e. cuts the cable 15 off or cuts it through at a desired point in order to achieve a cable 15 of a predetermined cable length with two ends.

To crimp the cable 15 with a crimp contact, part of the cable 15 is pivoted out of the cable processing axis 6 and guided to a crimping press 8 (which is shown on the left of the cable processing axis 6 in FIG. 1). A crimp contact is connected to a first end of the cable 15 by means of the first crimping press 8. A second crimping press 8 is arranged on the other side of the cable processing axis 6 (on the right in FIG. 1). A second end of the cable 15 opposite the first end is connected to a crimp contact by means of the second crimping press 8.

Further workstations to which the cable 15 is moved are possible.

Figure 2:
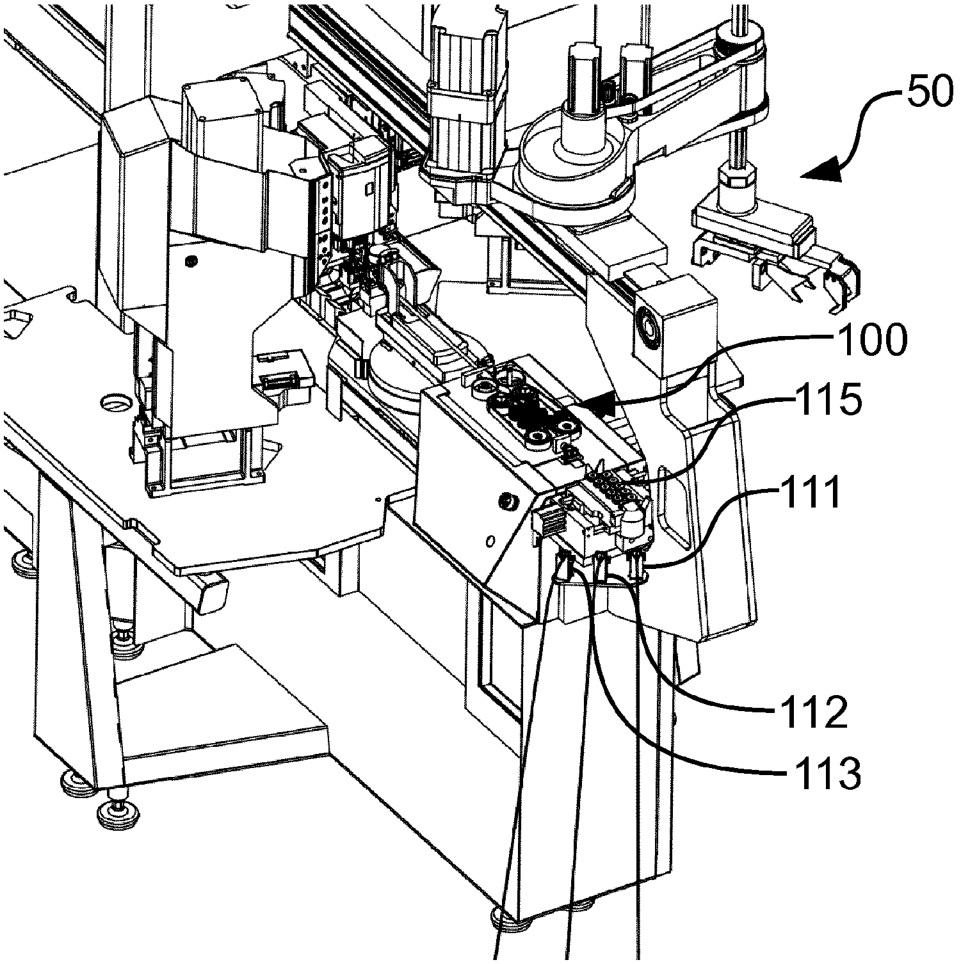
FIG. 2 is a partial view of the crimping system of FIG. 1.

FIG. 2 is a partial view of the crimping system 1 of FIG. 1. The crimping system 1 has a cable replacement device 110 (FIG. 6) which can hold a plurality of cables 15. In addition, the crimping system 1 has an alignment unit 115 which aligns the cable 15 that is currently being used by the crimping device 5. In addition, the crimping system 1 or the crimping device 5 comprises a cable conveyor device 100 which conveys the cable 15, i.e. pulls more of the cable 15 into the crimping system 1 or can convey the cable 15 out of the crimping device 5 again.

Figure 3:
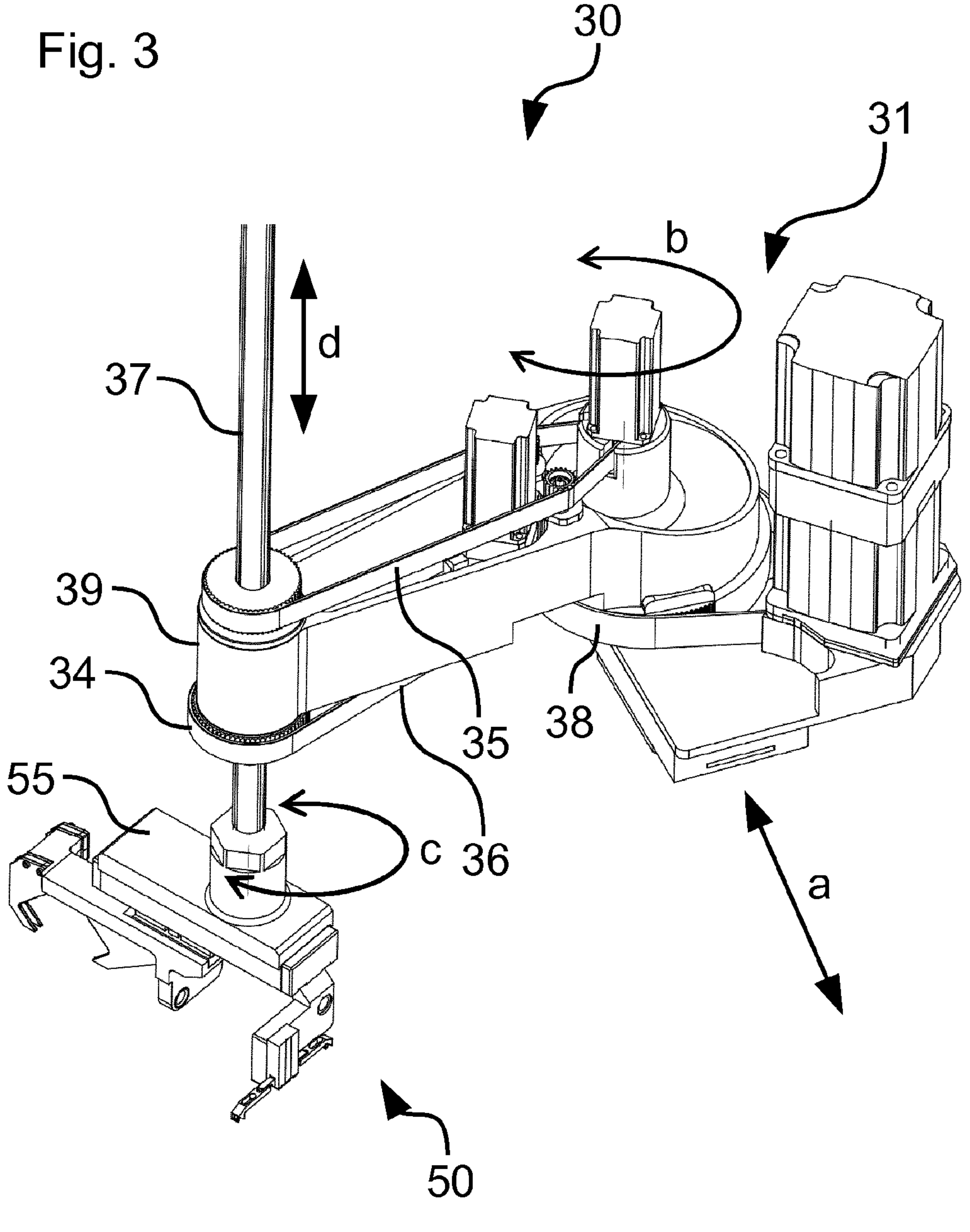
FIG. 3 is a detailed view of a gripping unit of the crimping system of FIG. 1.
Figure 4A:
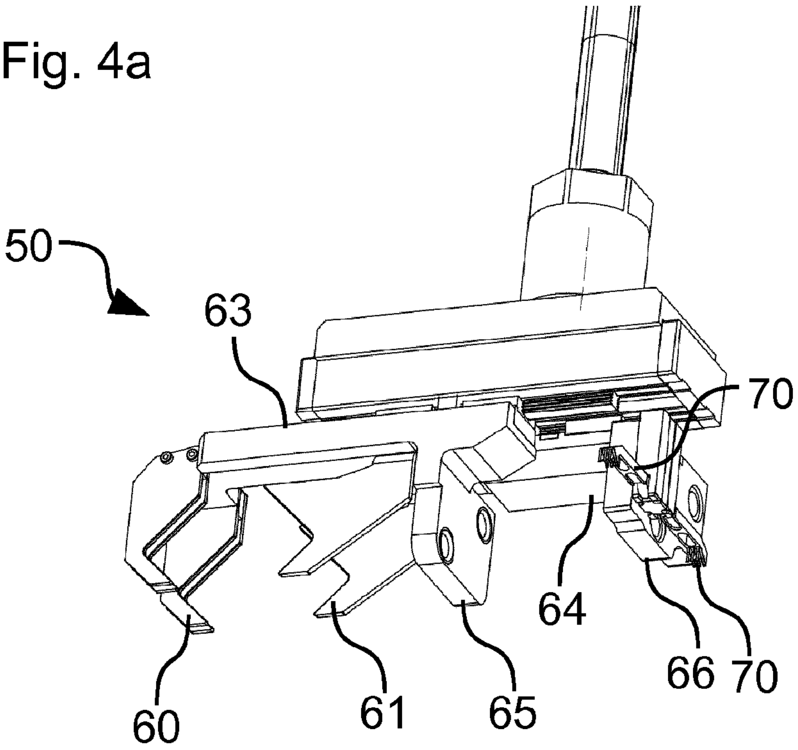
FIG. 4*a* is a detailed view of the gripping unit of FIG. 3 in the open position of the gripping jaws.
Figure 4B:
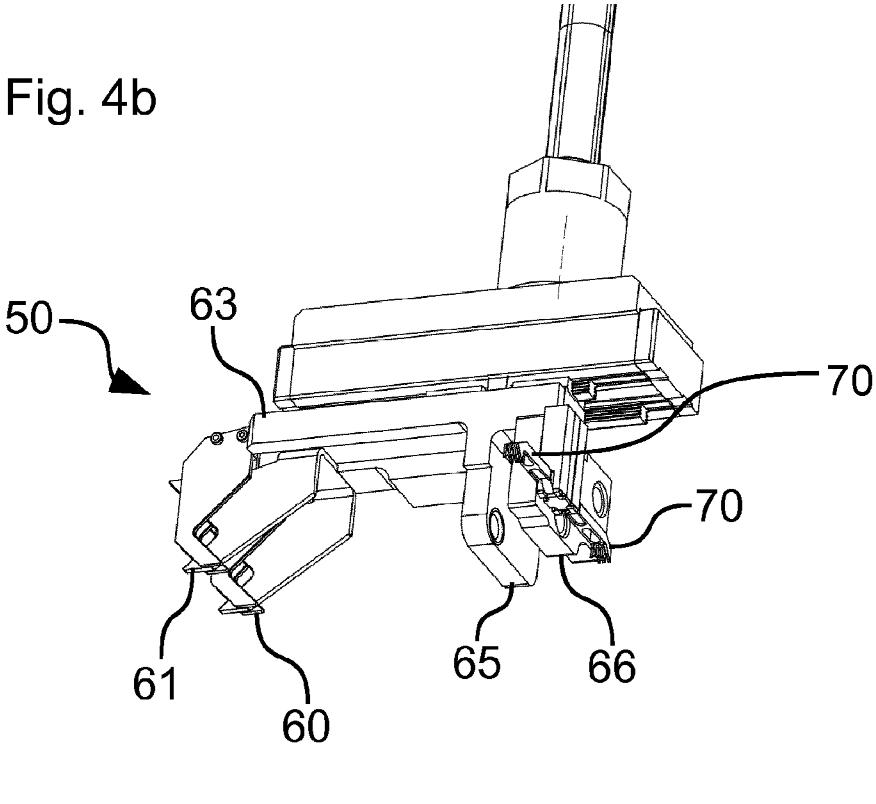
FIG. 4*b* is a detailed view of the gripping unit of FIG. 3 in the closed position of the gripping jaws.

FIG. 3 is a detailed view of a gripping unit 50 of the crimping system 1 of FIG. 1. FIG. 4*a* is a detailed view of the gripping unit 50 according to FIG. 3 in the open position of the gripping jaws 60, 61. FIG. 4*b* shows a detailed view of the gripping unit 50 according to FIG. 3 in the closed position of the gripping jaws 60, 61.

The handling robot 30 of the cable processing machine apparatus can be attached to the cable processing machine 5 or to the crimping machine or to the crimping device 5 or can be connected thereto. The handling robot 30 comprises a gripping unit 50 with a gripping arm 55. The gripping unit 50 or the gripping arm 55 can be moved linearly parallel to the cable processing axis 6 by means of a carriage 31 of the gripping unit 50. For this purpose, the handling robot 30 has a linear guide 32 (FIG. 1) on which the carriage 31 is guided. The linear guide 32 runs above the cable processing axis 6, along which the cable 15 is moved in the cable processing machine 5.

The handling robot 30 allows automation of a large number of processes that were previously carried out manually or by hand.

The gripping arm 55 of the handling robot 30 can be moved on both sides of the cable processing machine 5 or crimping machine or crimping device 5, i.e. the left side and the right side in FIG. 1. For this purpose, the crimping device 5 has a corresponding recess or a corresponding shape at the end of the crimping device 5, which is not visible in FIG. 1, in the direction of the cable processing axis 6. The gripping arm 55 can, so to speak, be moved around one end of the crimping device 5. The gripping arm 55 can thus be moved on a first side of the linear guide 32 and on a second side of the linear guide 32 opposite the first side.

The gripping unit 50 can be moved back and forth along the linear guide 32 in the direction a. For this purpose, the crimping system 1 has a toothed belt drive 33 of the linear guide 32. A gripping arm 55 of the gripping unit 50 is attached to a rod 37 (FIG. 3). The gripping arm 55 can be rotated about a vertical axis by means of a rotary and linear unit 34 (indicated by the double arrow c in FIG. 3). The vertical axis runs through the center of the rod 37. The gripping arm 55 together with the rod 37 can also be moved up and down (indicated by the double arrow d in FIG. 3). In this way, the height of the gripping arm 55 relative to the crimping device 5 can be changed. For this purpose, the rotary and linear unit 34 has two further toothed belt drives 35, 36.

By means of the pivot arm 39 of the gripping unit 50, the distance between the gripping arm 55 and the linear guide 32 can be changed. By a rotation along the double arrow b, the distance between the gripping arm 55 and the linear guide 32 can be increased or decreased. In addition, the gripping arm 55 can thereby be moved to the other side of the linear guide 32 or the crimping device 5. The rotation along the double arrow b can be carried out by a third toothed belt drive 38.

The gripping arm 55 can pick up the cables 15 from the cable replacement device 110 and put them down again or hang them there. As a result, the cable 15 used by the crimping device 5 can be exchanged or replaced in an automated manner.

The gripping arm 55 is operated pneumatically. The gripping arm 55 comprises two jaw carriers 63, 64 which close symmetrically. The gripping jaws 60, 61 fastened to the jaw carriers 63, 64 point towards one another in the open position which is shown in FIG. 4*a*. The gripping jaws 60, 61 are designed to grip a plurality of cables 15 or to release cables 15. The gripping jaws 60, 61 each have a recess which is designed to receive and hold production batches from the removal trough 22. The gripping jaws 60, 61 each comprise two elements which are spaced from one another in the open position.

In the closed position of the gripping jaws 60, 61, which is shown in FIG. 4*b*, there are two openings at the location of the depressions of the gripping jaws 60, 61, in which the batches of processed cables 15 can be received and held.

Both jaw carriers 63, 64 each have a flange element 65, 66 with holes. In the open position of the gripping jaws 60, 61, one of the flange elements 65, 66 is arranged, so to speak, on the rear side of a jaw. The flange elements 65, 66 are designed to grip and hold a cable processing cassette such as a crimping cassette 80 (FIG. 1).

In the closed position of the gripping jaws 60, 61, the flange elements 65, 66 are also in a closed position.

A two-part cable gripper 70 which is designed to grip and hold individual cables 15, is arranged on one of the flange elements 65, 66 (on the right flange element 65 in FIG. 4*a* or FIG. 4*b*) of the gripping unit 50 or of the gripping arm 55. In FIG. 4*a* and in FIG. 4*b*, the cable gripper 70 is in the open position. The cable gripper 70 can grasp and (firmly) hold a single cable 15, so that the cable 15 cannot slide relative to the cable gripper 70. The cable gripper 70 also has a semi-closed position in which the cable 15 is held by the cable gripper 70 such that the cable 15 can slide relative to the cable gripper 70. The cable 15 can thus slide through the cable gripper 70. As a result, the cable gripper 70 can move along the cable 15.

The gripping arm 55 is designed to remove from the removal trough 22 batches of finished cables 15 or a plurality of finished cables 15 that have been conveyed from the cable tray 20 into the removal trough 22.

Figure 5:
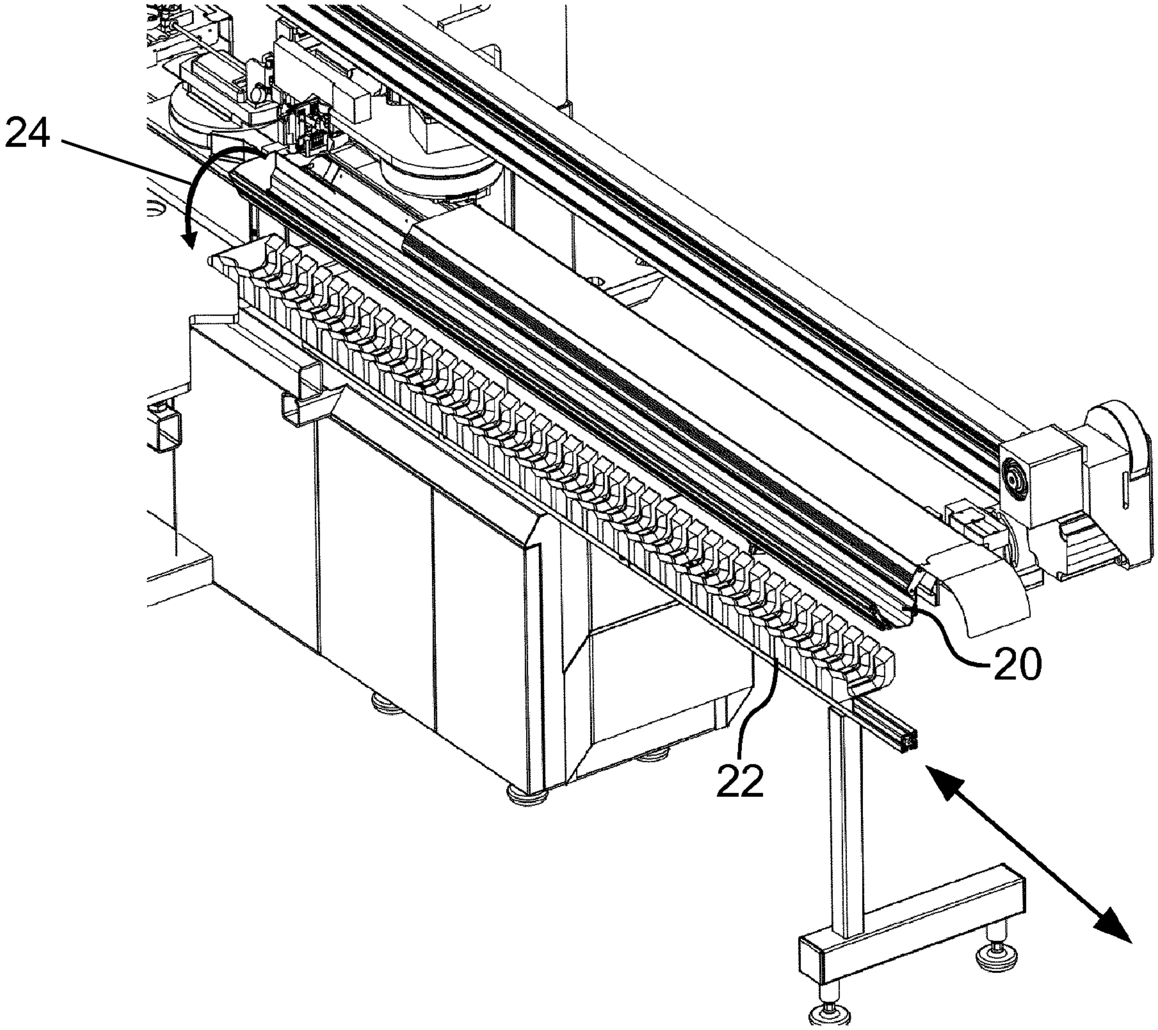
FIG. 5 is a detailed view of the cable tray and the removal trough of the crimping system of FIG. 1.

FIG. 5 is a detailed view of the cable tray 20 and the removal trough 22 of the crimping system 1 of FIG. 1. The processed or crimped cables 15 are stored in the cable tray 20. When the cables 15 of a production batch, i.e. a specific number of cables 15, are present in the cable tray 20, the cable tray 20 is tilted (this is indicated in FIG. 5 by a curved arrow 24), for example by a pneumatic device, and the cables 15 in the cable tray 20 fall into the removal trough 22 located below.

The gripping arm 55 can remove the cables 15 from the removal trough 22 by means of the gripping jaws 60, 61 and, for example, transport them into a holding device, boxes or the like.

The removal trough 22 can be moved pneumatically in the direction of the double arrow 24 in FIG. 5 with respect to the cable tray 20, so that the removal trough 22 is completely removed from the region of a hood that covers part of the cable processing machine 5 or the crimping device 5.

The removal trough 22 can be designed as a non-smooth channel and have a plurality of cutouts or depressions which make it easier to grasp the cables 15 located in the removal trough 22 by means of the gripping arm 55. The removal trough 22 shown in FIG. 5 is composed of individual segments. Other variants, such as a pressed sheet metal part, deep-drawn plastics, etc., are also possible in order to achieve a comparable design.

The gripping jaws 60, 61 of the gripping unit 50 or of the gripping arm 55 can be divided so that they can engage in more than one depression of the removal trough and can grip the cables 15 or the batch at a plurality of points at the same time. The large number of depressions in the removal trough 22 also makes it possible, in the case of batches of longer cables 15, to grasp or hold them over a wide range of lengths or, if necessary, with a plurality of grippers or gripping arms 55.

In the following it is explained by way of example and with the aid of various methods what the handling robot 30 or the gripping unit 50 or the gripping arm 55 can perform or carry out automatically on the crimping system 1 or the crimping device 5.

Figure 6:
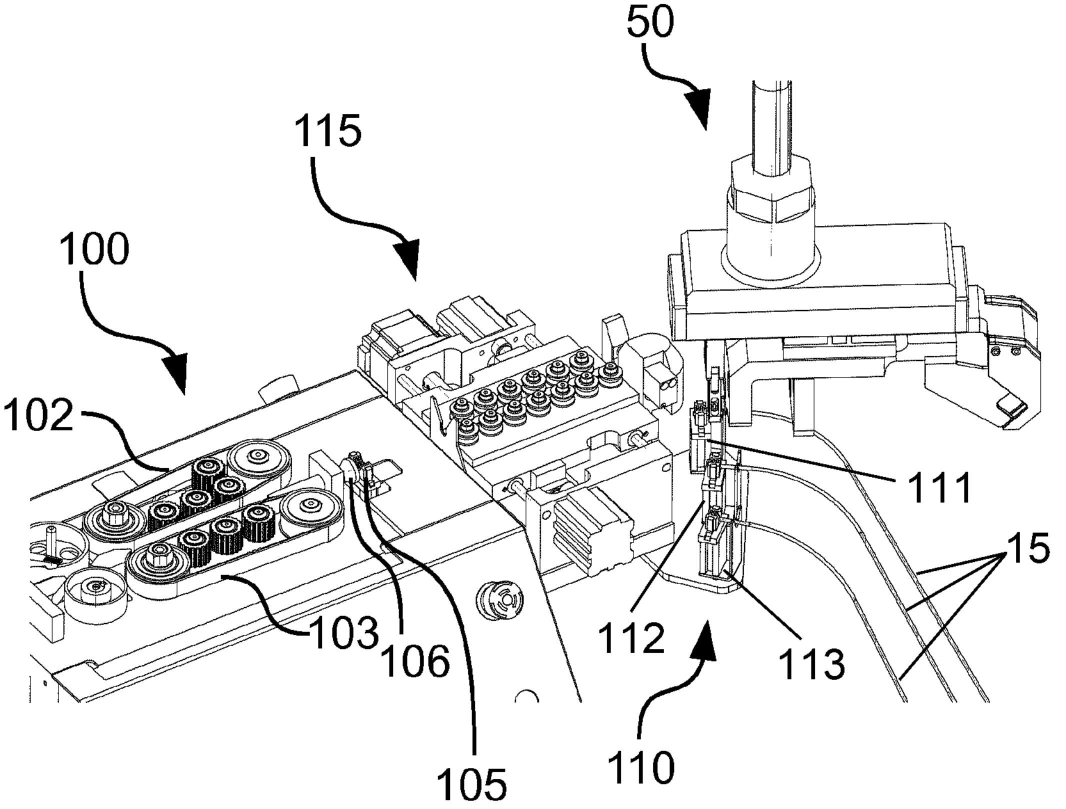
FIG. 6 is a detailed view of the cable conveyor device and the alignment unit of the crimping system of FIG. 1.

FIG. 6 shows a detailed view of the cable conveyor device 100 and the alignment unit 115 of the crimping system 1 according to FIG. 1. The crimping system 1 comprises an alignment unit 115 for aligning the cable 15. In addition, the crimping system 1 comprises a cable conveyor device 100 with two transport belts 102, 103 for conveying the cable 15 after it has been introduced into the cable conveyor device 100 by means of the alignment unit 115 through a guide tube 106. A clamping device 105, in which the cable 15 can be clamped, is arranged between the cable conveyor device 100 and the alignment unit 115. The cable replacement device 110 for holding a plurality of cables 15 is arranged on the side of the alignment unit 115 facing away from the cable conveyor device 100.

One process that can be carried out by means of the handling robot 30 or the gripping arm 55 is a cable replacement, i.e. the replacement of the cable 15 used by the crimping device 5.

A cable replacement is necessary when the cable bundle is empty or an article with a different cable 15 is to be processed. In the first case, a second cable of the same type is prepared in one of the three cable receptacles 111-113 (FIG. 2) of the cable holding device 110, while in the second case there must also be an empty space there to accommodate the old cable.

The cable 15 to be replaced is introduced or threaded into the cable processing machine 5 as follows:

The cable conveyor device 100 and the alignment unit 115 are opened and the cable gripper 70 of the gripping unit 50 takes over the cable 15 in a program-controlled or computer-controlled manner from the correct gripper or holder of the cable receiving device 110. This is shown in FIG. 6.

Figure 7A:
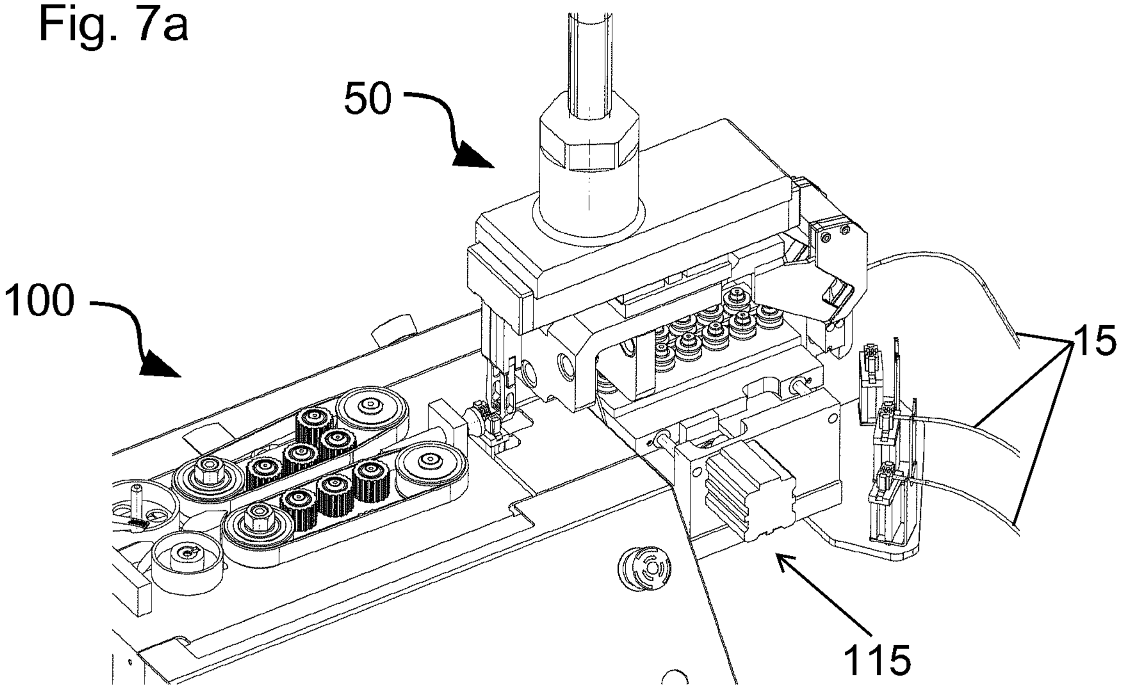
FIG. 7*a* is a first detailed view of the alignment unit of the crimping system of FIG. 1.
Figure 7B:
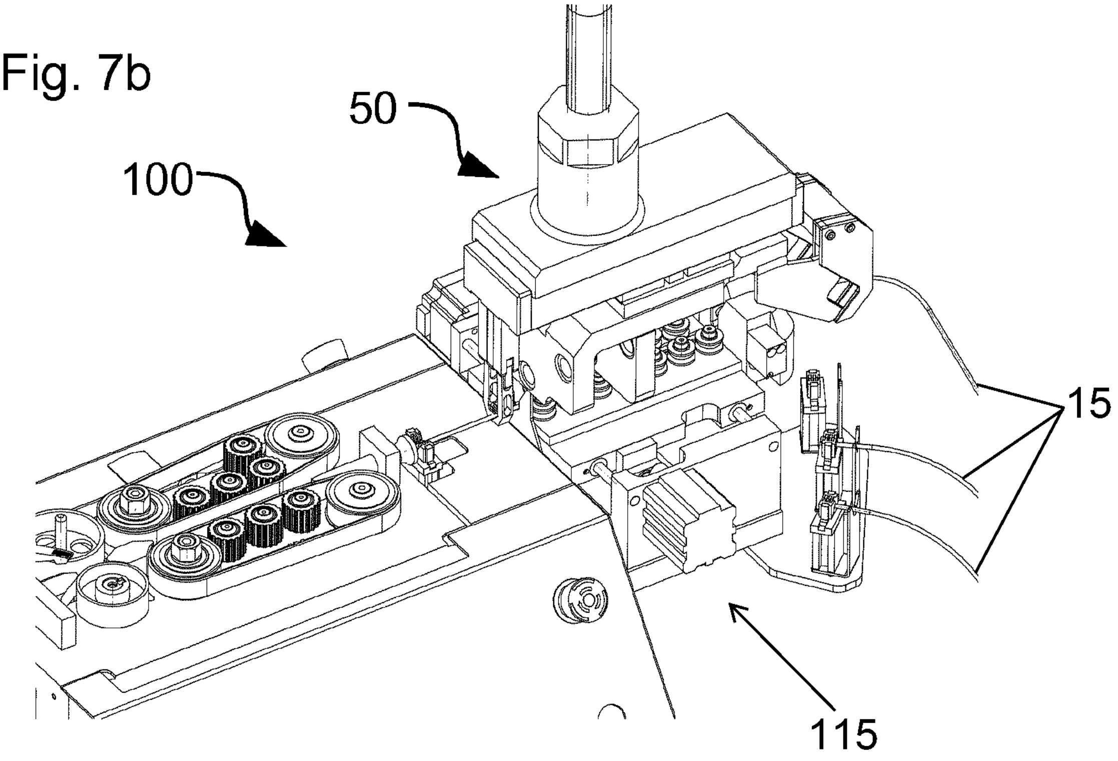
FIG. 7*b* is a second detailed view of the alignment unit of the crimping system of FIG. 1.
Figure 7C:
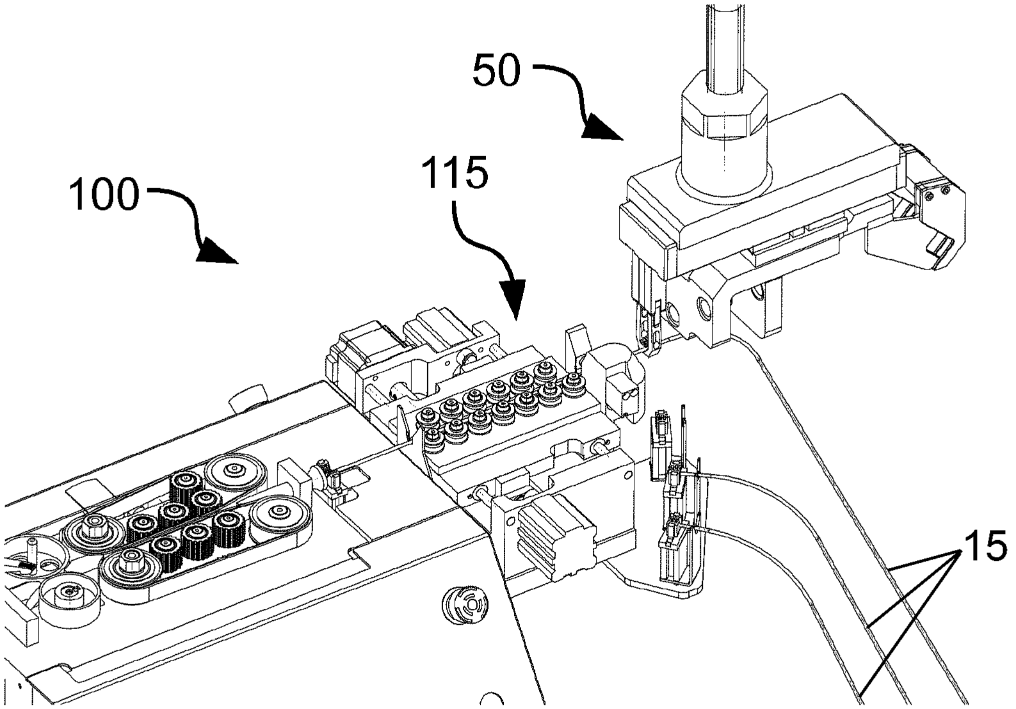
FIG. 7*c* is a third detailed view of the alignment unit of the crimping system of FIG. 1.

FIG. 7*a* is a first detailed view of the alignment unit 115 of the crimping system 1 of FIG. 1. FIG. 7*b* shows a second detailed view of the alignment unit 115 of the crimping system 1 of FIG. 1. FIG. 7*c* shows a third detailed view of the alignment unit 115 of the crimping system 1 of FIG. 1.

The gripping unit 50 is moved so that the cable 15 is inserted into the guide tube 106. Then the cable 15 is clamped in the clamping device 105 so that the cable gripper 70 can "grip" by being brought into the semi-closed position, being moved away from the guide tube 106 (wherein the cable 15 slides along in the cable gripper 70) and being brought again into the completely closed position so that the cable 15 cannot slide relative to the cable gripper 70.

Afterwards, the clamping device 105 is opened so that the cable 15 is no longer clamped, and the cable 15 is pushed further into the cable conveyor 100 by the gripping unit 50. This is repeated a plurality of times until the cable 15 can be securely grasped by the transport belts 102, 103 when the cable conveyor device 100 is closed. This process is shown in FIGS. 7*a*-7*c*.

As soon as the transport belts 102, 103 clamp the cable 15 securely, the cable 15 can be tensioned. For this purpose, the clamping device 105 is closed and the gripping unit 50 moves back until the cable gripper 70 is in front of the alignment unit 115 (see FIG. 7*c*). The gripping unit 50 also moves vertically up and down in order to avoid collisions and the clamping force of the cable gripper 70 is reduced (e.g. by means of a pressure regulating valve) so that it assumes the so-called semi-closed position so that the cable 15 can slide in the gripping arm 55.

Afterwards, the alignment unit 115 is closed, so that the actual threading process is completed.

To remove the cable 15, the cable 15 is transported backwards by the cable conveyor device 100 until the transport belts 102, 103 (FIG. 6) lose contact with the cable 15. Afterwards, the cable conveyor device 100 and the alignment unit 115 are opened and the gripping unit 50 grasps the cable 15 near the clamping unit device 105 in order to pull it out of the guide tube 106 with a single grasp, again in interaction with the clamping device 105. The gripping unit 50 is then moved to the cable replacement device 110 and there transfers the cable 15 to one of the cable grippers 70 or cable holders.

A further example of an automated process by means of the handling robot 30 is the replacement of the crimping cassette 80 or the cassette replacement, which is described below.

In a comparable manner to the cable replacement, the crimping cassette 80 must be replaced when the crimping roller inserted in the crimping cassette 80 is empty or when the article to be produced has a different crimp contact. If continuous production is to be possible without manual intervention by the machine operator, the necessary crimping cassettes 80 are to be provided in the crimping cassette receptacle 82 (FIG. 8).

Since the gripping unit 50 can be moved to both crimping presses 8, one crimping cassette receptacle 82 or crimping cassette holder on one side of the crimping device 5 is sufficient to supply both crimping presses 8 or to replace the crimping cassette 80 in both crimping presses 8. If a large number of crimping cassettes 80 are provided, the crimping cassette receptacle 82 can be designed in such a way that the crimping cassettes 80 are actively brought from a crimping cassette storage device to a transfer position for transferring the crimping cassette 80 to the gripping arm 55.

Figure 8:
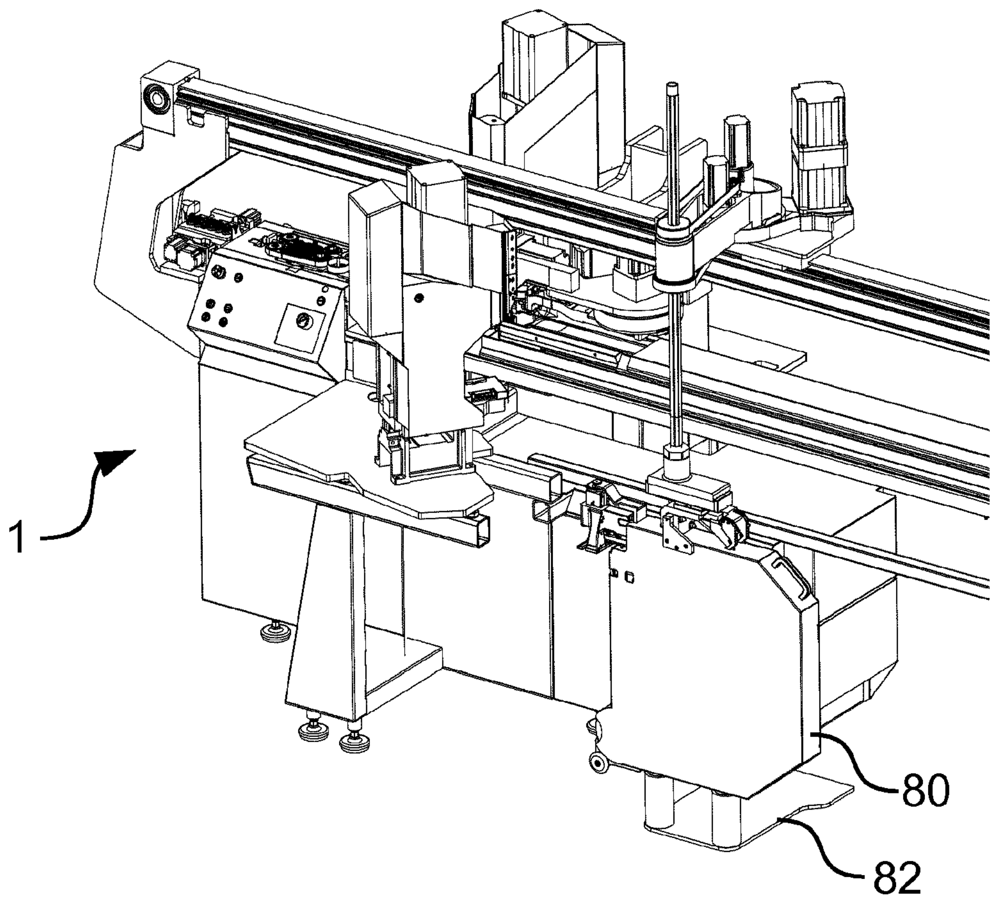
FIG. 8 is a detailed view of the cable processing machine of FIG. 1.

FIG. 8 is a detailed view of the crimping cassette receptacle 82 of the crimping system 1 of FIG. 1.

In the simplest case, as shown in FIG. 8, the crimping cassette receptacle 82 has a plurality of spaces for crimping cassettes 80 arranged adjacent to one another, all of which are located in the range of movement of the handling robot 30.

Figure 9A:
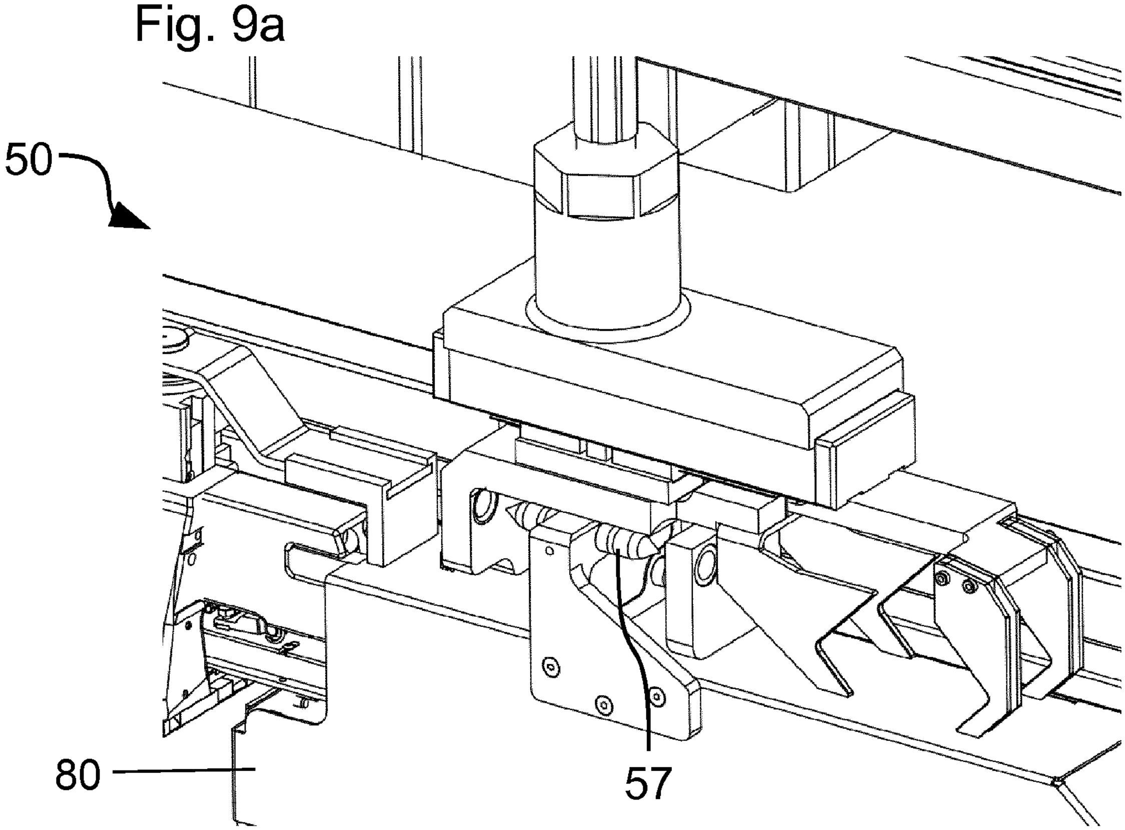
FIG. 9*a* is a first detailed view of the gripping unit of the crimping system of FIG. 1 when picking up a crimp cassette.
Figure 9B:
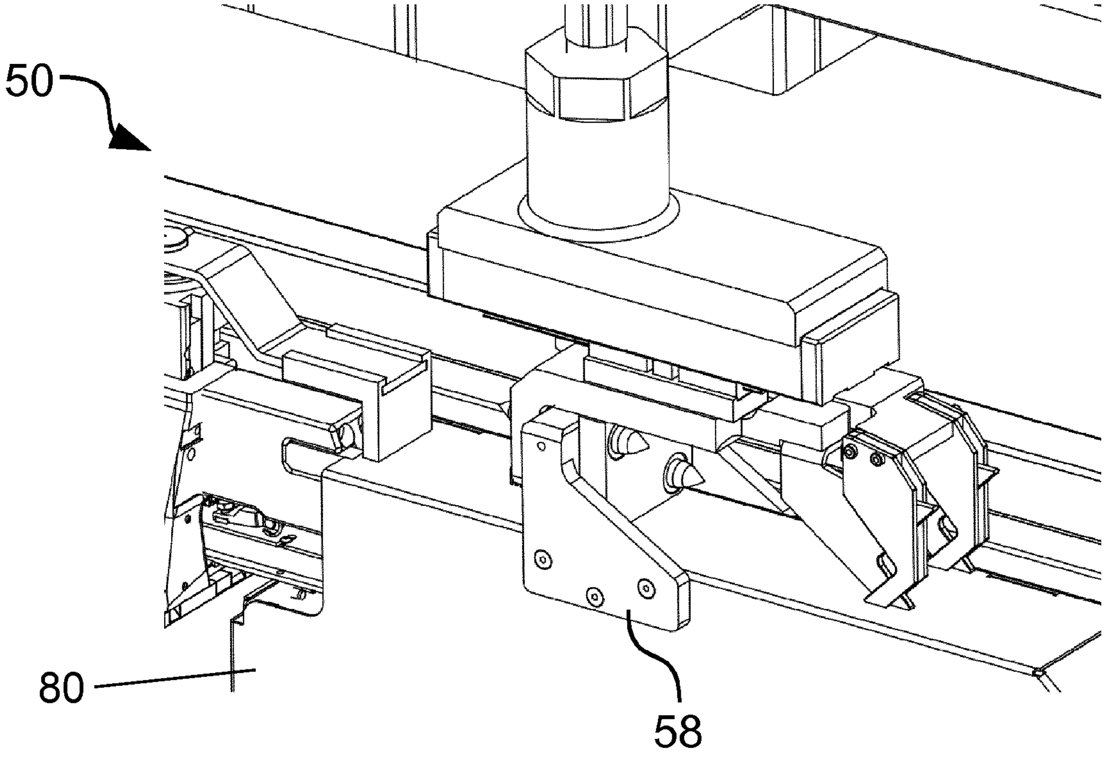
FIG. 9*b* is a second detailed view of the gripping unit of the crimping system of FIG. 1 when picking up a crimp cassette.

FIG. 9*a* is a first detailed view of the gripping unit 50 of the crimping system 1 according to FIG. 1 when a crimping cassette 80 is picked up. FIG. 9*b* is a second detailed view of the gripping unit 50 of the crimping system 1 according to FIG. 1 when a crimping cassette 80 is picked up.

The cassette is replaced, if necessary, by placing the old crimping cassette 80 in the crimping cassette receptacle 82 and gripping of the new crimping cassette 80 by the gripping arm 55. FIG. 9*a* and FIG. 9*b* show the interaction of the gripping unit 50 and the holder on the crimping cassette 80. Due to the centering function of the four retaining bolts 57 on a crimping cassette holder 58, the position of the crimping cassettes 80 can vary somewhat and the crimping cassette 80 can nevertheless be securely gripped by the gripping unit 50. In the flange elements 65, 66 (FIG. 4*a*) of the gripping arm 55, openings corresponding to the retaining bolts 57 are present. By engagement of the retaining bolts 57 in the openings, the crimping cassette 80 is gripped and held by the gripping arm 55.

The crimping cassette 80 is then moved to or into the crimping press 8 and gripped or clamped there. The crimping cassette 80 has a base plate 85 (FIG. 1) on which the crimp connection is made.

Figure 10:
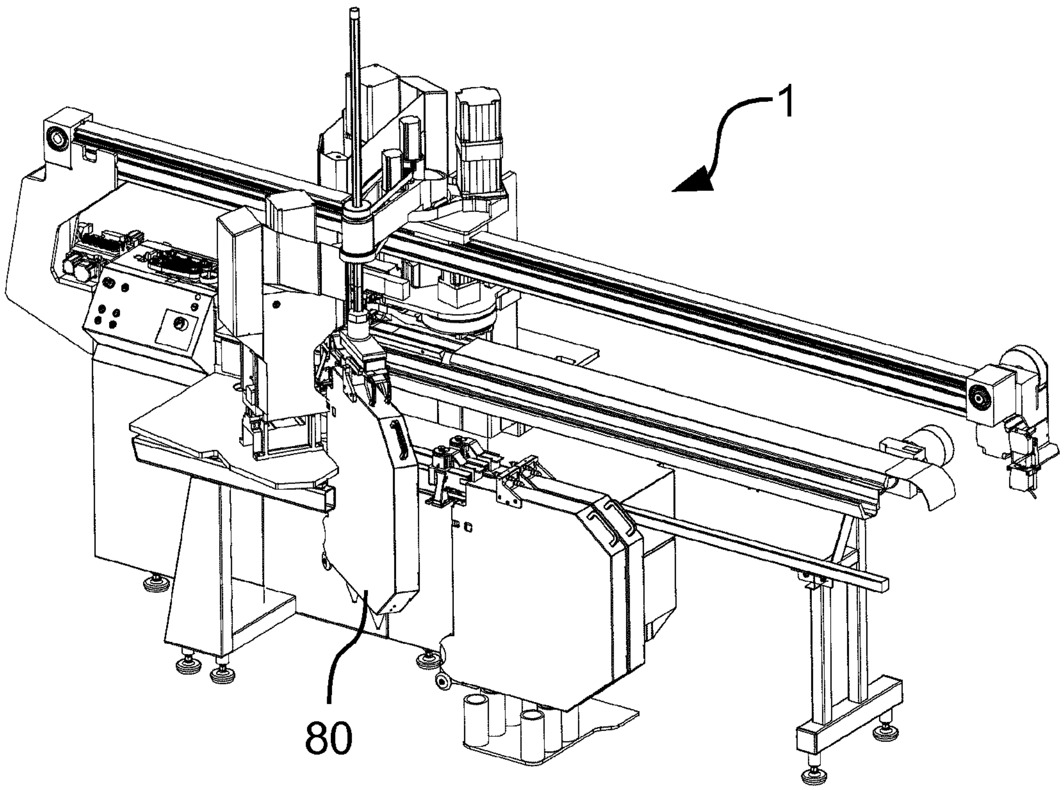
FIG. 10 is a further perspective view of the crimping system of FIG. 1 with a crimping cassette used.

The state after this step is shown in FIG. 10. FIG. 10 shows a further perspective view of the crimping system 1 according to FIG. 1 with a crimping cassette 80 that is used.

Figure 11:
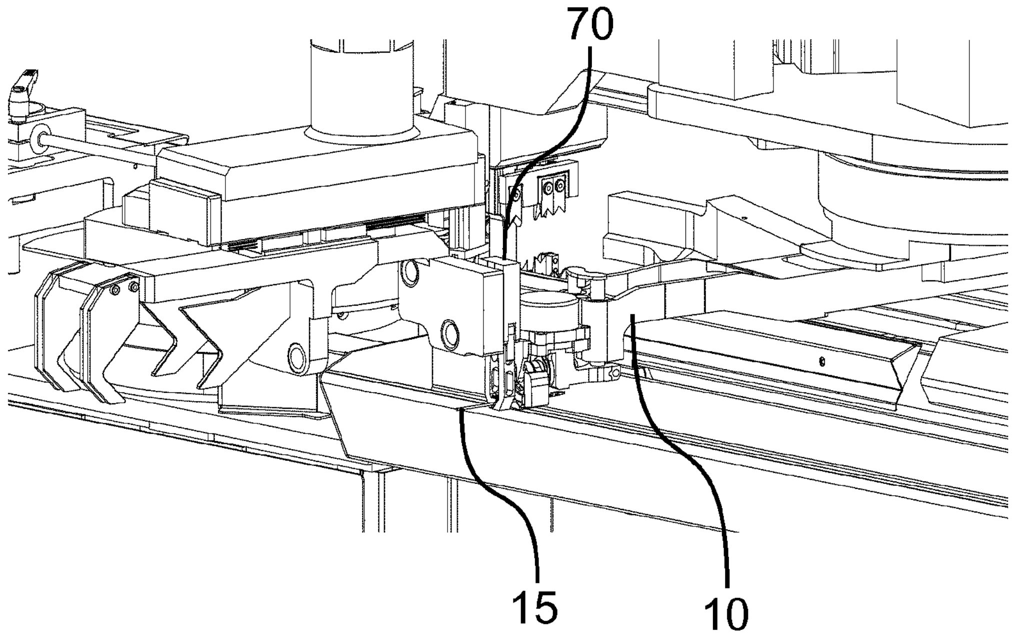
FIG. 11 is a detailed view of the cable gripper of the gripping unit of the crimping system of FIG. 1.

FIG. 11 shows a detailed view of the cable gripper 70 of the gripping unit 50 of the crimping system 1 according to FIG. 1.

A further example of an automated process by means of the handling robot 30 is the checking of processed cables 15 or cable samples, which is described below.

The cables 15 can be brought to quality control devices by means of the gripping unit 50. These can be taken over directly by the gripping unit 50 from the pivoted-out pivot unit 10 of the cable processing machine 5 or crimping machine or crimping device 5. In FIG. 11, the transfer from the pivot unit 10 of the cable processing machine 5 to the gripping unit 50 or the cable gripper 70 of the gripping unit 50 is currently taking place.

Figure 12:
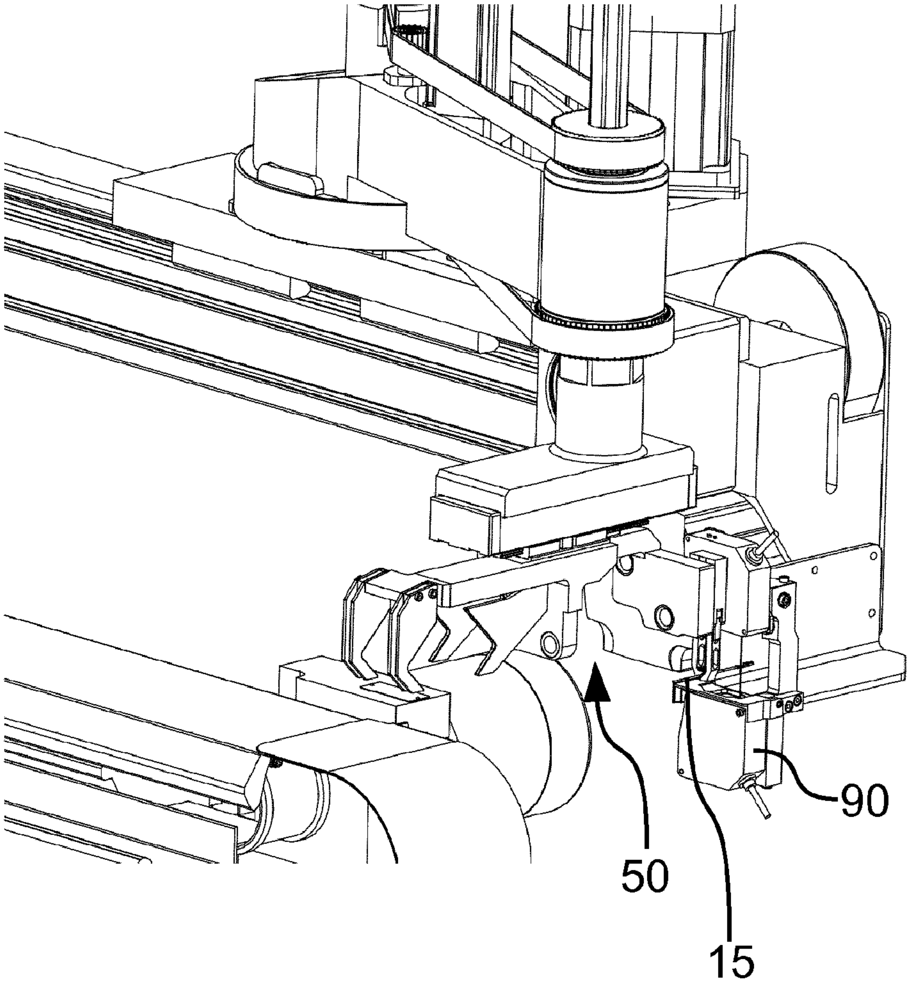
FIG. 12 is a detailed view of the cable gripper of the gripping unit of the crimping system of FIG. 1 when checking the quality of the cable.

The handling robot 30 then brings the cable 15 to the quality control device 90 or to an inspection station. FIG. 12 shows a detailed view of the cable gripper 70 of the gripping unit 50 of the crimping system 1 according to FIG. 1 during checking of the quality of the cable 15. FIG. 12 shows the optical measurement of the crimp height by way of example. Here, the crimp height can be measured in a simple manner at a plurality of points on the crimp contact, since the cable 15 can be freely positioned in space in different positions relative to the quality control device 90 by means of the gripping arm 55 or the gripping unit 50.

Figure 13A:
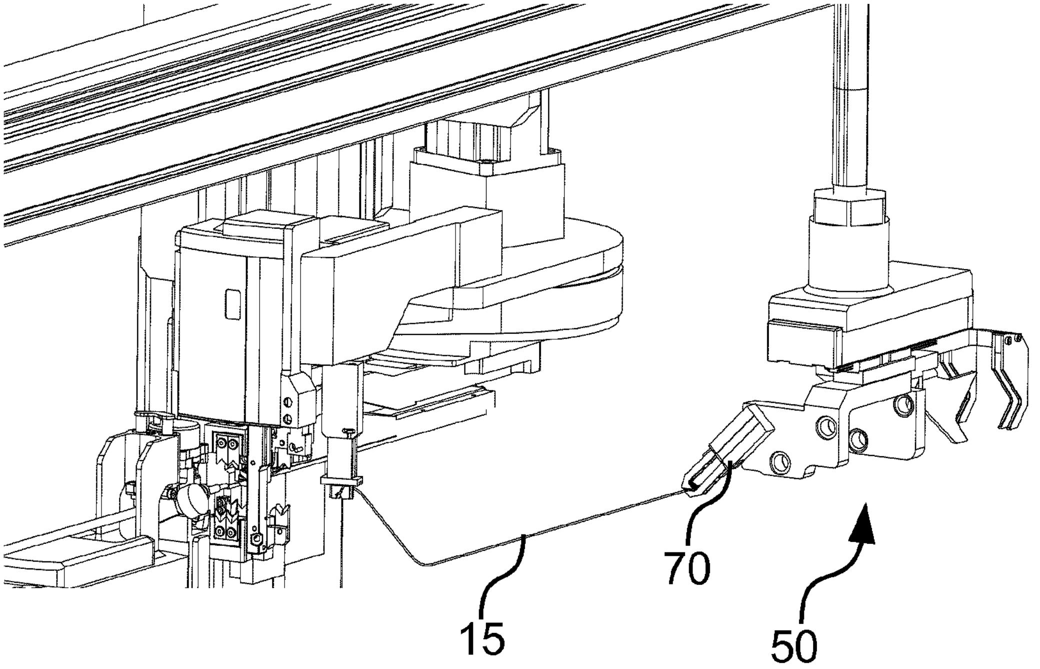
FIG. 13*a* is a first detailed view of the cable gripper of the gripping unit of the crimping system of FIG. 1 when guiding the cable.
Figure 13B:
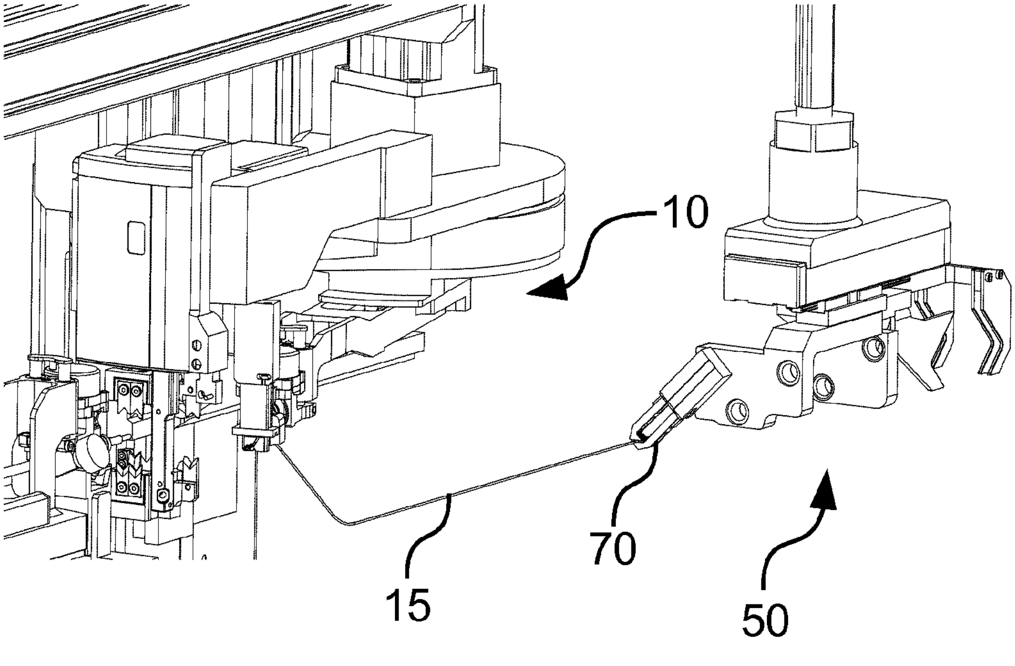
FIG. 13*b* is a second detailed view of the cable gripper of the gripping unit of the crimping system of FIG. 1 when guiding the cable.

FIG. 13*a* shows a first detailed view of the cable gripper 70 of the gripping unit 50 of the crimping system 1 according to FIG. 1 while the cable 15 is being guided. FIG. 13*b* shows a second detailed view of the cable gripper 70 of the gripping unit 50 of the crimping system 1 according to FIG. 1 while the cable 15 is being guided.

A further example of an automated process by means of the handling robot 30 is the removal of defectively produced cables 15 (so-called faulty cables) from the crimping device 5, which is described below.

The defectively produced cables 15 can be removed from the machine most easily if both ends of the cable 15 can be gripped. In order to make this possible, the storage gripper can be used, which is already present in some machines in order to facilitate the cable storage in the cable tray 20.

The faulty cable or defective cable 15 is first transferred from the pivot unit 10 of the crimping device 5 to the storage gripper, which grasps it at the trailing end of the cable 15. The leading end of the cable 15 is already in the cable tray 20 and should be removed again therefrom. For this purpose, the cable gripper 70 of the gripping unit 50 grabs the faulty cable immediately behind the storage gripper and moves with reduced gripper pressure (semi-closed position) in the direction of the leading cable end, the cable 15 sliding in the cable gripper 70. FIG. 13*a* shows the situation when this step is completed. A variant of the gripping unit 50 is shown in which the cable gripper 70 can be rotated in order to improve accessibility.

The trailing cable end is then transferred to the pivot unit again 10. This is shown in FIG. 13*b*.

Figure 14:
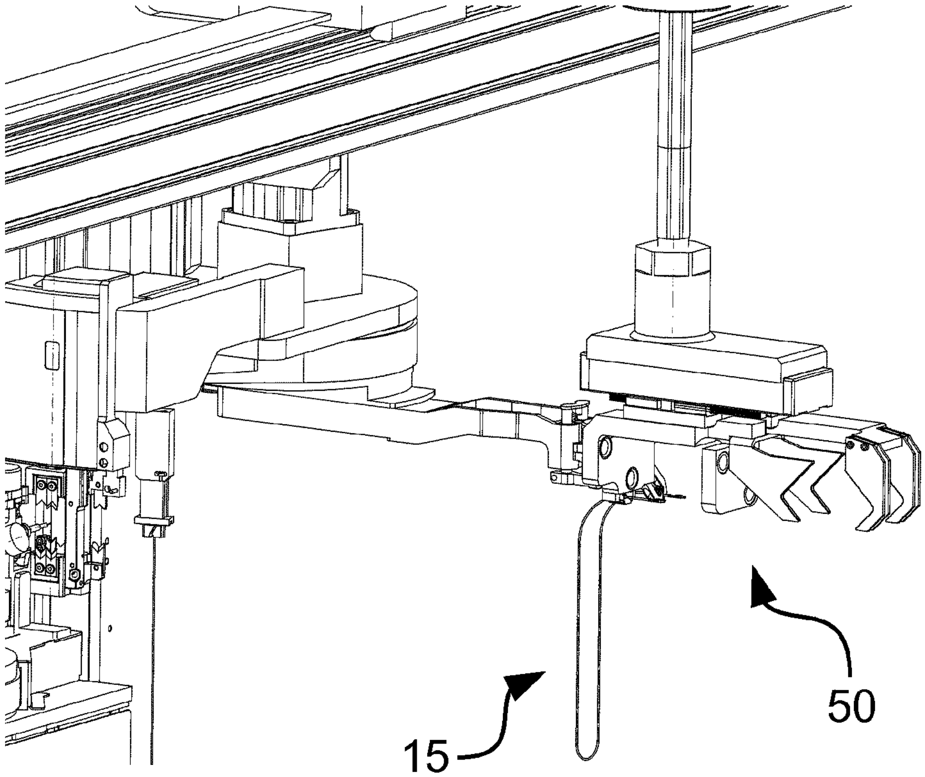
FIG. 14 is a detailed view of the gripping unit of the crimping system of FIG. 1 while holding a cable.

The pivot unit 10 is then pivoted out completely and the gripping unit 50 is rotated and moved until both cable ends are parallel and located outside the cable tray 20. This is shown in FIG. 14. FIG. 14 shows a detailed view of the gripping unit 50 of the crimping system 1 according to FIG. 1 while a cable 15 is held at both ends. The faulty cable or the cable 15 can now be disposed of outside the cable tray 20, for example by dropping it into a container.

Figure 15:
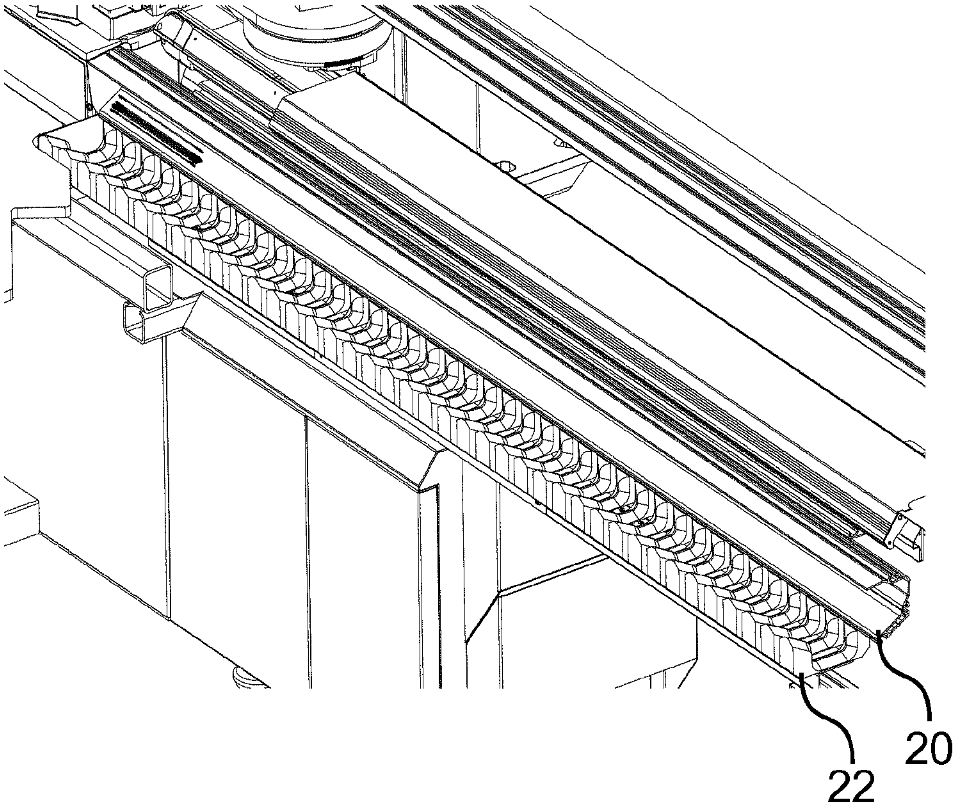
FIG. 15 is a detailed view of the cable tray and the removal trough of the crimping system of FIG. 1.

FIG. 15 shows a detailed view of the cable tray 20 and the removal trough 22 of the crimping system 1 according to FIG. 1.

A further example of an automated process by means of the handling robot 30 is the removal of production batches or processed cables 15 from the removal trough 22, as described below.

When the desired number of cables 15 for a production batch is reached in the cable tray 20, the cable tray 20 is pivoted or tilted so that the batch or the cables 15 fall(s) into the removal trough 22.

Figure 16:
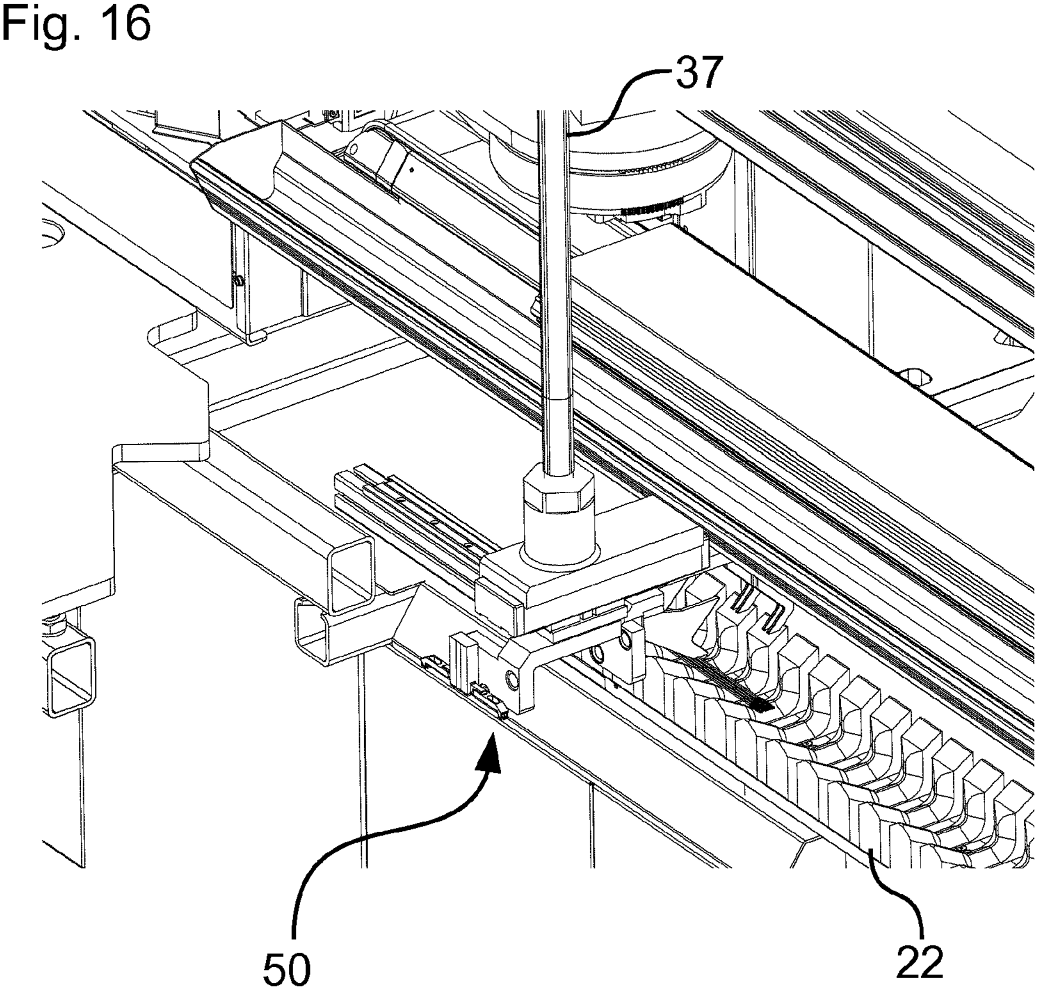
FIG. 16 is a detailed view of the removal trough of the crimping system of FIG. 1.

FIG. 16 shows a detailed view of the removal trough 22 of the crimping system 1 according to FIG. 1.

The removal trough 22 is then moved in the longitudinal direction in order to bring it into a region that can be reached by the handling robot 30 and the gripping unit 50 is positioned above the removal trough 22 in such a way that the gripping jaws 60, 61 are above the desired recess or depression in the removal trough 22. This is shown in FIG. 16.

Figure 17A:
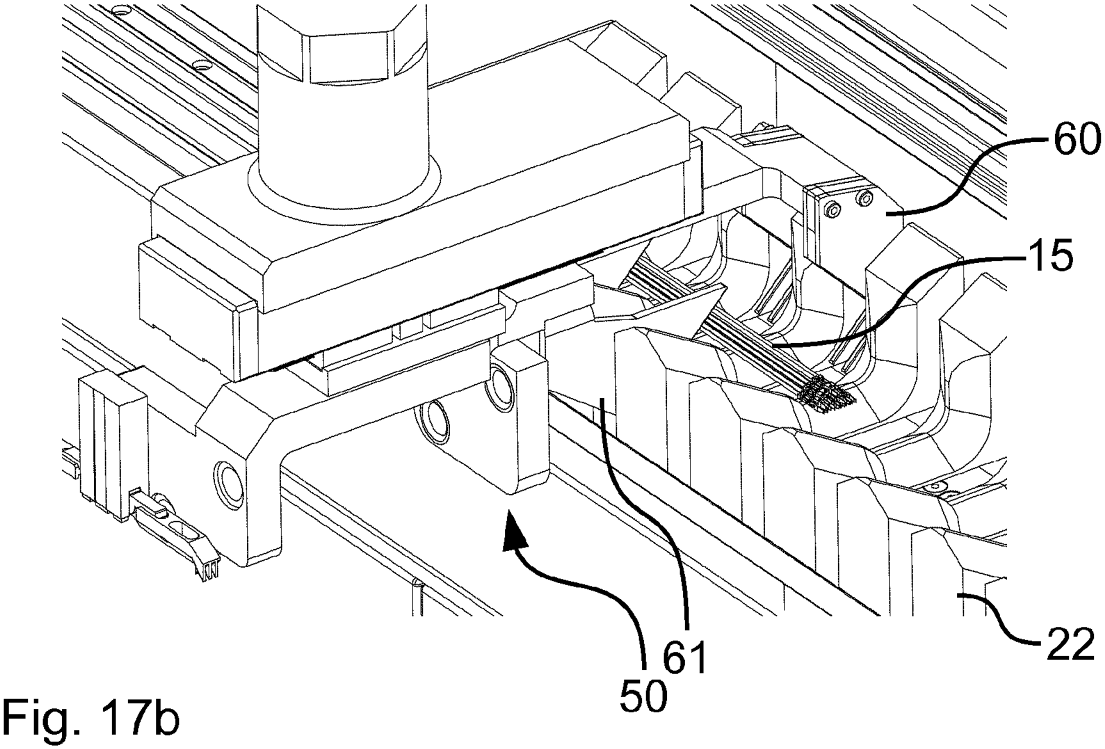
FIG. 17*a* is a first detailed view of the removal trough of the crimping system of FIG. 1 when removing cables.
Figure 17B:
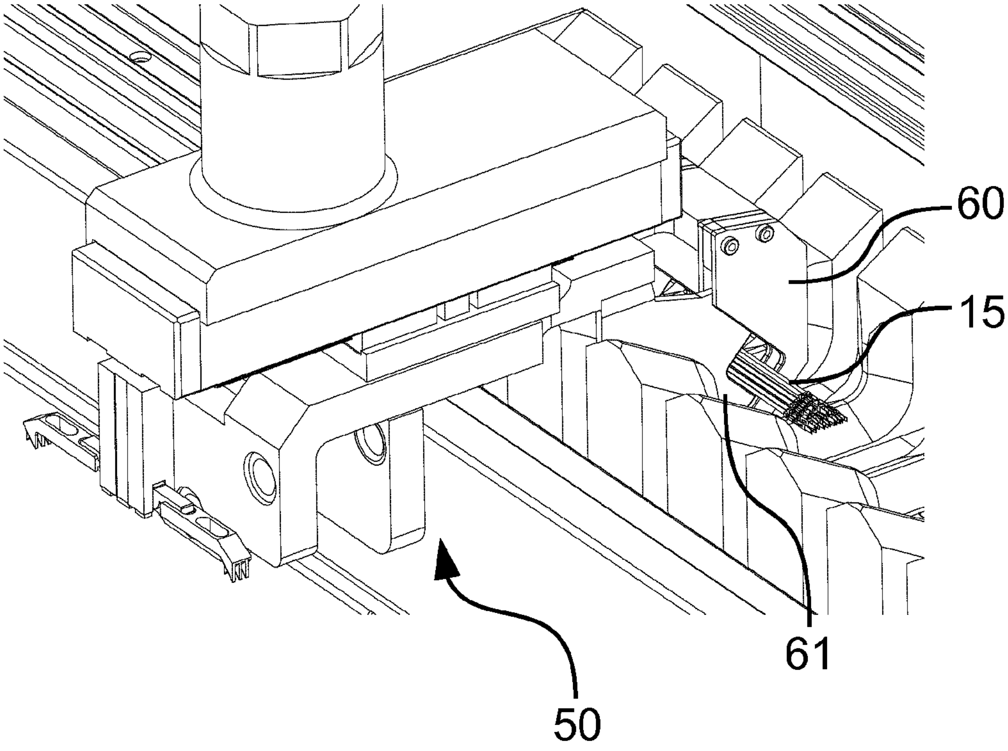
FIG. 17*b* is a second detailed view of the removal trough of the crimping system of FIG. 1 when removing cables.

FIG. 17*a* shows a first detailed view of the removal trough 22 of the crimping system 1 of FIG. 1 when cables 15 are removed. FIG. 17*b* shows a second detailed view of the removal trough 22 of the crimping system 1 of FIG. 1 when cables 15 are removed.

The gripping unit 50 is then lowered (see FIG. 17*a*) and the gripping jaws 60, 61 are closed (see FIG. 17*b*) in order to grip and hold the production batch or the cables 15. The gripping arm 55 or the gripping unit 50 can now be raised in order to remove the cables 15 from the removal trough 22.

If the production batches have been removed from or taken out of the removal trough 22, they can be transferred to a suitable device, such as, for example, transport racks on which the batches or cables 15 are suspended and/or transport containers in which the batches or cables 15 are placed.

The cable processing machine 5 can comprise a further pivot unit in addition to the pivot unit 10 shown in FIG. 11. The further pivot unit can move a cable 15 out of the cable processing axis 6 by swiveling or pivoting the pivot unit with part of the cable 15 out of the cable processing axis 6.

Finally, it should be noted that terms such as “having,” “comprising,” etc. do not preclude other elements or steps, and terms such as “a” or “an” do not exclude a plurality of elements or steps. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 cable processing machine apparatus (crimping system)
5 cable processing machine (crimping device)
6 cable processing axis
8 crimping press
10 pivot unit
15 cable
20 cable tray
22 removal trough
24 tilt direction
30 handling robot
31 carriage
32 linear guide
33 toothed belt drive of the linear guide
34 rotary and linear unit
35, 36 toothed belt drives for rotary and linear unit
37 rod
38 third toothed belt drive
39 pivot arm
50 gripping unit
55 gripping arm
57 retaining bolt
58 crimping cassette holder
60, 61 gripping jaws

63, 64 jaw carrier
65, 66 flange elements
70 cable gripper
80 crimping cassette
82 crimping cassette receptacle
85 base plate
90 quality control device
100 cable conveyor device
102, 103 transport belt
105 clamping device
106 guide tube
110 cable replacement device
111-113 cable receptacle
115 alignment unit
a movement direction
b rotation direction
c rotation direction
d up and down direction

The invention claimed is:

1. A cable processing machine apparatus comprising:

a cable processing machine for processing cables;

a handling robot having a gripping arm for gripping part of a cable and for moving the cable at least one of into the cable processing machine and out of the cable processing machine; and wherein the handling robot is adapted to grip cable processing cassettes, including crimping cassettes, to exchange one of the crimping cassettes used by the cable processing machine for another one of the crimping cassettes.

2. The A cable processing machine apparatus comprising:

a cable processing machine for processing cables;

a handling robot having a gripping arm for gripping part of a cable and for moving the cable at least one of into the cable processing machine and out of the cable processing machine; and wherein the cable processing machine apparatus includes a crimp cassette receptacle for holding a plurality of crimp cassettes for use in processing the cables.

3. A cable processing machine apparatus comprising:

a cable processing machine for processing cables;

a handling robot having a gripping arm for gripping and holding the cable processing cassettes; and wherein the handling robot is adapted to grip the cable processing cassettes, including crimping cassettes, to exchange one of the crimping cassettes used by the cable processing machine for another one of the crimping cassettes.

* * * * *